United States Patent [19]
Dorenbosch et al.

[11] Patent Number: 6,118,980
[45] Date of Patent: Sep. 12, 2000

[54] METHOD AND APPARATUS FOR REDUCING INBOUND TRANSMISSIONS IN A TWO-WAY MESSAGING SYSTEM

[75] Inventors: Jheroen Pieter Dorenbosch, Paradise, Tex.; Craig Allen Lee, Boynton Beach, Fla.

[73] Assignee: Motorola, Inc., Schaumburg, Ill.

[21] Appl. No.: 09/007,974

[22] Filed: Jan. 16, 1998

[51] Int. Cl.[7] .................................................. H04B 7/00
[52] U.S. Cl. ......................... 455/31.3; 455/507; 455/517
[58] Field of Search ................................... 455/31.1, 31.2, 455/31.3, 38.1, 38.4, 422, 458, 507, 517, 69, 70; 340/825.44

[56] References Cited

U.S. PATENT DOCUMENTS

| | | | |
|---|---|---|---|
| 5,649,289 | 7/1997 | Wang et al. | 455/31.3 |
| 5,878,351 | 3/1999 | Alanara et al. | 455/31.3 |
| 5,918,174 | 6/1999 | Chennakeshu et al. | 455/69 |

*Primary Examiner*—Thanh Cong Le
*Attorney, Agent, or Firm*—R. Louis Breeden

[57] ABSTRACT

A fixed portion (102) of a two-way messaging system transmits (502) a first message (400) including a value (408) indicative of a response probability desired from a portable subscriber unit (122). The portable subscriber unit receives (602) the first message and selects (614) between responding (616) and not responding to the first message, in a manner that satisfies the response probability.

19 Claims, 5 Drawing Sheets

*700*

METHOD AND APPARATUS FOR REDUCING INBOUND TRANSMISSIONS IN A TWO-WAY MESSAGING SYSTEM

FIELD OF THE INVENTION

This invention relates in general to wireless messaging systems, and more specifically to a method and apparatus for reducing inbound transmissions in a two-way messaging system.

BACKGROUND OF THE INVENTION

The advent of two-way messaging systems has enabled new communication applications. One such application is the ability to conduct polling exercises. For example, an outbound message can be transmitted by a fixed portion of a two-way messaging system using a group address to which a plurality of portable subscriber units are responsive. The outbound message can ask a question and provide some candidate responses, e.g., "yes" and "no". Users of the subscriber units polled can then each select a response to be returned on an inbound channel. Unfortunately, however, when many users are polled, inbound channel traffic can temporarily exceed the traffic capacity of the inbound channel, blocking other inbound traffic and generally snarling two-way communications.

Similarly, when large groups of subscriber units are sent an information services (IS) message on a common group address, too many acknowledgments of the message can also snarl communications. For this reason, portable subscriber units typically have been programmed to send only negative acknowledgments to IS messages. (If no response to an IS message is received by the fixed portion, a positive acknowledgment is assumed.) The negative acknowledgments allow service providers to assess the reliability of IS message transmissions. Still, if the IS message is sent to a large enough group of subscriber units, the quantity of negative acknowledgments can again create excessive inbound traffic.

Thus, what is needed is method and apparatus for reducing inbound transmissions in a two-way messaging system, particularly in response to messages sent to a group address. The method and apparatus preferably will allow polling exercises to continue with minor impact, and further will allow service providers to assess the reliability of IS message transmissions.

SUMMARY OF THE INVENTION

An aspect of the present invention is a method of reducing inbound transmissions in a two-way messaging system. The method comprises, in a fixed portion of the two-way messaging system, the step of transmitting a first message comprising a value indicative of a response probability desired from a portable subscriber unit. The method further comprises, in the portable subscriber unit, the steps of receiving the first message; and selecting between responding and not responding to the first message, in a manner that satisfies the response probability.

Another aspect of the present invention is a controller for reducing inbound transmissions in a two-way messaging system. The controller comprises a network interface for receiving messages from message originators, and a processing system coupled to the network interface for processing the messages and for directing operation of the controller. The controller further comprises a base station interface coupled to the processing system for communicating with a base station to send and receive outbound and inbound messages. The processing system is programmed to transmit a first message comprising a value indicative of a response probability desired from a portable subscriber unit.

Another aspect of the present invention is a portable subscriber unit for reducing inbound transmissions in a two-way messaging system. The portable subscriber unit comprises a receiver for receiving a first message comprising a value indicative of a response probability desired from the portable subscriber unit, and a processing system for processing the first message and for controlling the portable subscriber unit. The portable subscriber unit further comprises a transmitter coupled to the processing system for transmitting a response to the first message, and a user interface for interfacing with a user. The processing system is programmed to select between responding and not responding to the first message, in a manner that satisfies the response probability.

DETAILED DESCRIPTION OF THE DRAWINGS

Figure 1:
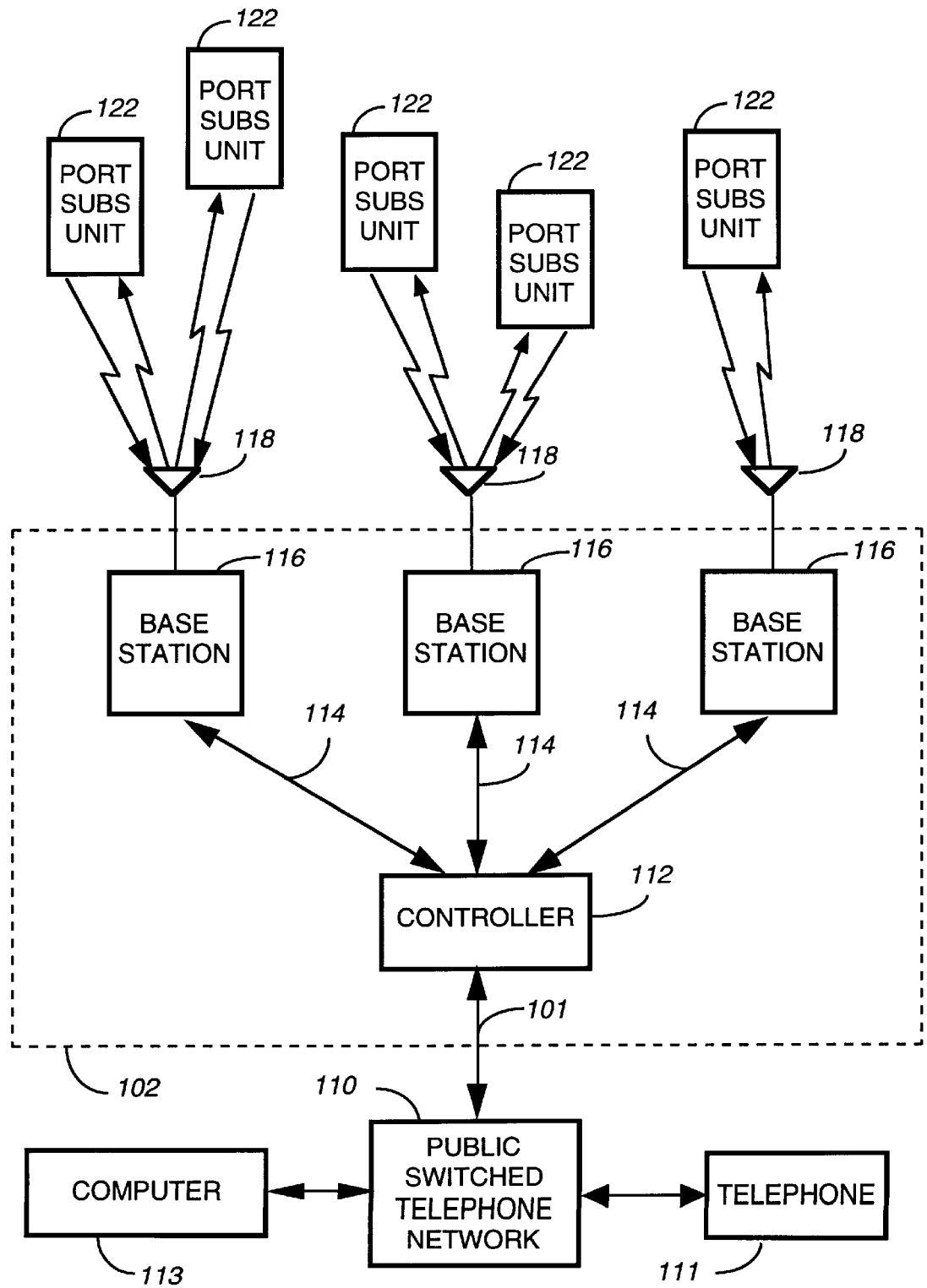
FIG. 1 is an electrical block diagram of a messaging system in accordance with the present invention.

Referring to FIG. 1, an electrical block diagram of an exemplary messaging system in accordance with the present invention comprises a fixed portion 102 including a controller 112 and a plurality of base stations 116, and a portable portion including a plurality of portable subscriber units 122, preferably having acknowledge-back capability. The base stations 116 preferably communicate with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator? paging terminal, and the RF-Conductor?™ message distributor manufactured by Motorola, Inc., and includes software modified in accordance with the present invention. The hardware of the base stations 116 is preferably a combination of the RF-Orchestra? transmitter and RF-Audience?™ receivers manufactured by Motorola, Inc. The portable subscriber units 122 are preferably similar to Tenor™ voice messaging units and Pagefinder™ data messaging units, also manufactured by Motorola, Inc., and having software modified in accordance with the present invention. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 113 coupled to the PSTN 110. It will be appreciated that, alternatively, other types of communication networks, e.g., packet switched networks and local area networks, can be utilized as well for transporting originated messages to the controller 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well.

Figure 2:
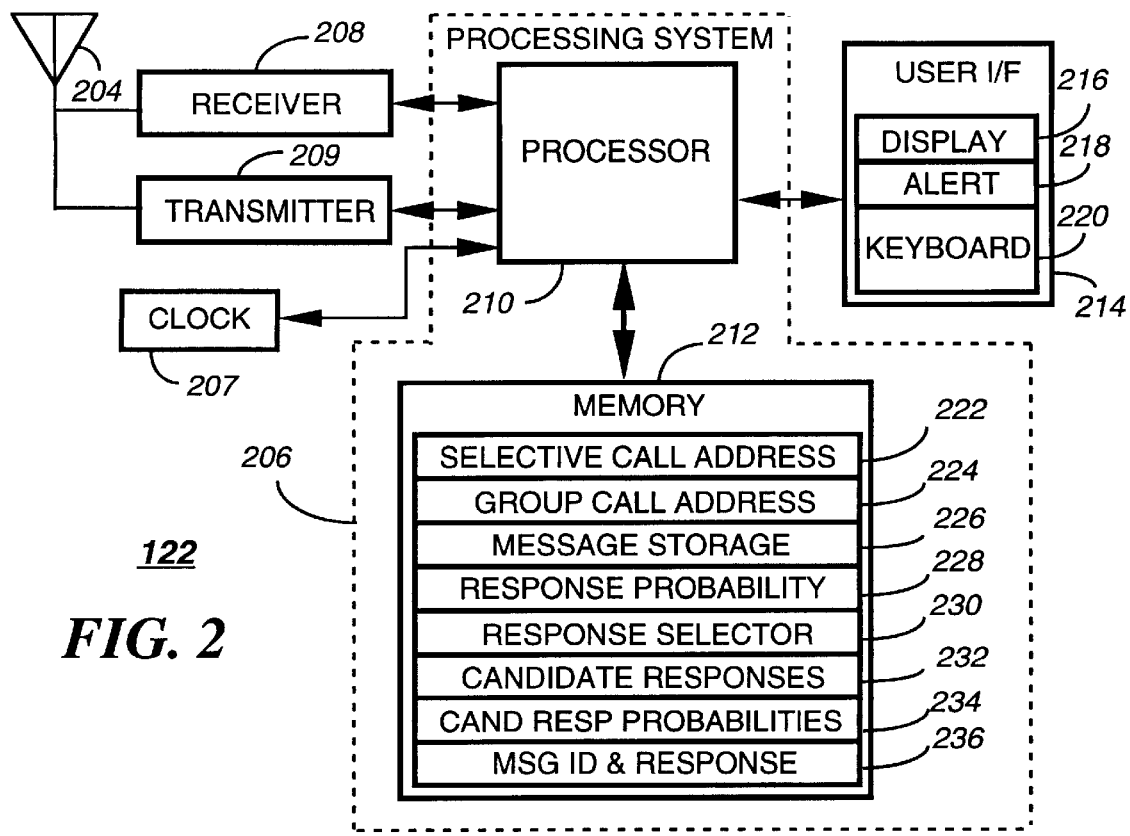
FIG. 2 is an electrical block diagram of a portable subscriber unit in accordance with the present invention.

FIG. 2 is an electrical block diagram of an exemplary portable subscriber unit 122 in accordance with the present invention. The portable subscriber unit 122 comprises an antenna 204 for intercepting an outbound message and for transmitting an inbound message. The antenna 204 is coupled to a conventional receiver 208 for receiving the outbound message and is also preferably coupled to a conventional transmitter 209 for transmitting the inbound message. The receiver 208 and the transmitter 209 are coupled to a processing system 206 for processing the outbound and inbound messages and for controlling the portable subscriber unit 122 in accordance with the present invention. A user interface 214 is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements in accordance with the present invention.

The processing system 206 comprises a conventional processor 210 and a conventional memory 212. The memory 212 comprises software elements and other variables for programming the processing system 206 in accordance with the present invention. The memory 212 preferably includes a selective call address 222 to which the portable subscriber unit 122 is responsive, and a group call address 224 to which the portable subscriber unit 122 is also responsive, along with other portable subscriber units 122 having the same group call address 224. The memory 212 further comprises a message storage space 226 for storing messages for further processing. In one embodiment, the memory 212 also includes space for storing a response probability 228 received in a statistical response message 400 (FIG. 4) for defining a desired probability that the portable subscriber unit will respond to the statistical response message 400. In addition, the memory 212 comprises a response selector 230 for programming the processing system 206 to select between responding and not responding, in a manner that satisfies the response probability. The memory 212 also includes storage for candidate responses 232 received in the statistical response message 400. In an alternative embodiment, the memory 212 includes space for candidate response probabilities 234 received in the statistical response message 400 for defining a separate probability of response desired for each candidate response 232, in lieu of the response probability 228. The memory 212 further comprises space for storing a message ID and response 236 selected by the user.

Figure 3:
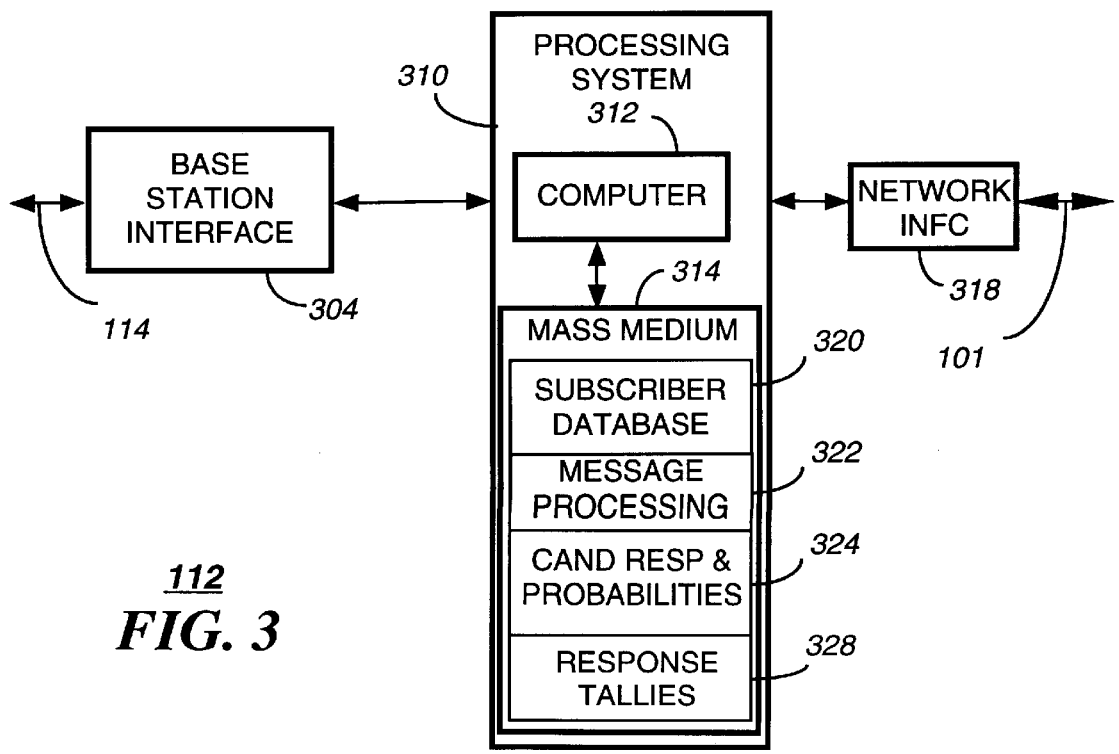
FIG. 3 is an electrical block diagram of a controller in accordance with the present invention.

FIG. 3 is an electrical block diagram of an exemplary controller 112 in accordance with the present invention. The controller 112 comprises a processing system 310 for executing the operations of the controller 112. The processing system 310 is coupled to a conventional network interface 318 for receiving messages through the telephone links 101. The processing system 310 is also coupled to a conventional base station interface 304 for controlling and communicating with the base stations 116 through the communication links 114. It will be appreciated that more than one base station interface 304 can be present, depending upon system size.

The processing system 310 comprises a conventional computer 312 and a conventional mass storage medium 314. The mass storage medium 314 includes, for example, a subscriber database 320, comprising subscriber information such as addressing and programming options of the portable subscriber units 122. The computer 312 is preferably programmed by way of software included in the mass storage medium 314 for providing the operations and features required in accordance with the present invention. The computer 312 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The mass storage medium 314 is preferably a conventional hard disk mass storage device. It will be appreciated that other types of conventional computers 312 can be utilized, and that additional computers 312 and mass storage media 314 of the same or alternative type can be added as required to handle the processing requirements of the processing system 310.

The mass storage medium 314 preferably includes software and various databases utilized in accordance with the present invention. The mass storage medium 314 preferably includes a message processing element 322 for processing messages through well-known techniques. The mass medium 314 also includes space for storing candidate responses and probabilities 324 for inclusion in the statistical response message 400 in accordance with the present invention. In addition, the mass medium 314 includes a response tallies element 328 for computing and storing tallies of responses received in accordance with the present invention, as will be described further below.

Figure 4:
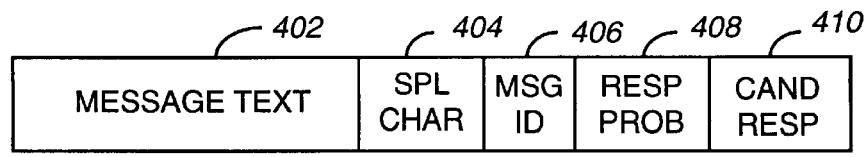
FIG. 4 is a protocol diagram depicting a structure suitable for a statistical response message in accordance with the present invention.

FIG. 4 is a protocol diagram depicting a structure suitable for the statistical response message 400 in accordance with the present invention. The statistical response message 400 preferably is entered into the controller by a message originator and sent in the standard user data portion of the outbound protocol. It will be appreciated that, alternatively, the statistical response message 400 can be generated or altered by the controller 112. The statistical response message 400 comprises message text 402, preferably including a polling question that is displayed on the display 216 when received by the portable subscriber unit 122. Alternatively, when the statistical response message 400 is an information services (IS) message, the message text can comprise IS data displayed in a special format. The statistical response message 400 further comprises a special character 404, preferably a non-displayed control character, for indicating to the portable subscriber unit 122 that the remainder of the statistical response message 400 comprises statistical response information. In addition, the statistical response message 400 includes a message identifier 406 for uniquely identifying the statistical response message 400. It will be appreciated that, alternatively, a standard message sequence number can be used to identify the statistical response message 400. The statistical response message 400 further comprises a response probability 408 for indicating the desired probability that the portable subscriber unit 122 will generate a response to the statistical response message 400. The statistical response message 400 also can include candidate responses 410, such as "yes", "no", "no opinion", etc. It will be appreciated that, alternatively, when the candidate responses 410 are included, a response probability 408 corresponding to each of the candidate responses 410 can be included as well. This is useful, for example, to equalize the number of responses of each kind when users are expected to generate particular responses, such as "no opinion", less frequently than other responses. It will be appreciated that, alternatively, a single response probability 408 can be utilized for the statistical response message 400 even when multiple candidate responses 410 are sent. It will be further appreciated that for simple questions with "yes/no" answers, the candidate responses 410 can be omitted. Similarly, for information services messages, which require no user-selected response and which respond automatically only when a negative acknowledgment is indicated, candidate responses 410 preferably are not included in the statistical response message 400.

Figure 5:
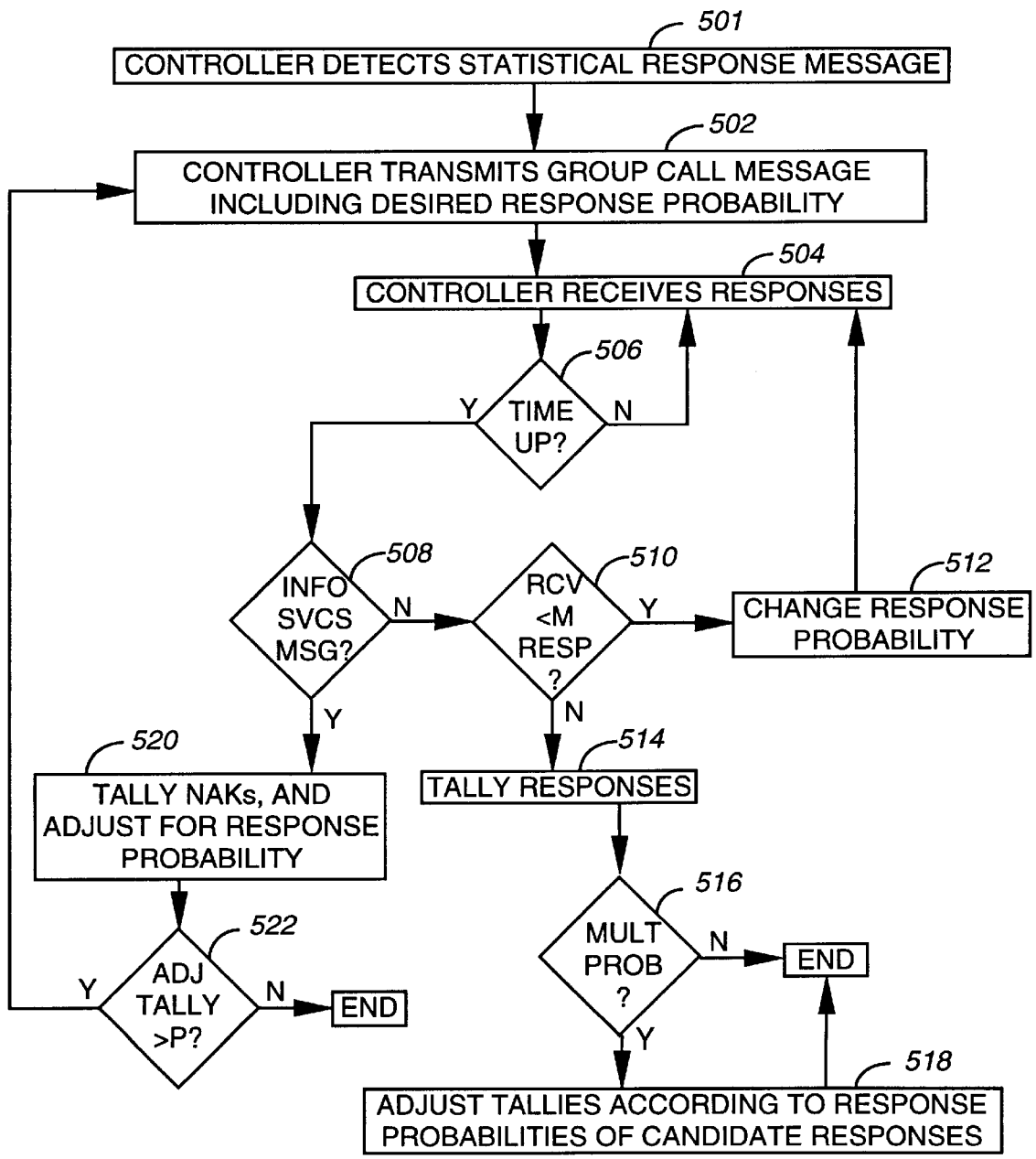
FIG. 5 is a flow diagram depicting operation of the controller when sending a statistical response message in accordance with the present invention.

FIG. 5 is a flow diagram 500 depicting operation of the controller when sending the statistical response message 400 in accordance with the present invention. First, the controller 112 detects the statistical response message 400. This can be accomplished, for example, by examining an originated message and determining that the special character 404 is present. Alternatively, a special character can be added at the beginning of the statistical response message 400 to facilitate detection. Next, the controller 112 controls the base stations 116 to transmit 502 the statistical response message 400 as a group call message, i.e., a message intended for a plurality of portable subscriber units 122, including a desired response probability 408. When the statistical response message 400 is a polling message, candidate responses 410 also can be sent, as well as response probabilities 408 corresponding to each candidate response 410, if desired. In any case, the controller then receives 504 the responses from the portable subscriber units 122 via inbound channel receivers (not shown) of the base stations 116 and further through the communication links 114. In step 506 the controller 112 checks whether a predetermined time for receiving responses to the statistical response message 400 has expired. If not, the controller 112 continues to monitor at step 504 for additional responses. When the time for receiving responses expires, the controller first checks 508 whether the statistical response message 400 was an IS message, i.e., a message limited to only negative acknowledgment responses. If not, the controller 112 checks 510 whether less than a first predetermined number of responses were received. If less than the first predetermined number of responses were received, the controller 112 changes 512 the response probability, preferably by transmitting a shortened statistical response message 400 comprising the message identifier 406 and a new response probability 408.

If, on the other hand, in step 510 no less than the first predetermined number of responses were received, then the controller 112 tallies 514 the responses. For the case of a polling message, the responses preferably are tallied by type, e.g., how many "yes" responses, how many "no" responses, etc. The controller 112 then checks 516 whether multiple response probabilities 408 were sent in the statistical response message 400, corresponding to multiple candidate responses 410. If not, the process ends. If so, the controller adjusts 518 the tallies according to the response probabilities assigned to the candidate responses. For example, if the candidate response tallies were 10 "yes" and 8 "no", with respective response probabilities of 0.1 and 0.2, then the tallies after adjustment would be 100 "yes" and 40 "no". The adjusted tallies are thus representative of the actual numbers of user responses of each type.

If, on the other hand, in step 508 the statistical response message is an IS message, then the controller 112 tallies 520 the NAKs, and adjusts the tally for the response probability. Then the controller 112 checks 522 whether the adjusted tally is greater than a second predetermined number. If so, the flow returns to step 502 to retransmit the IS message. If not, the process ends.

Figure 6:
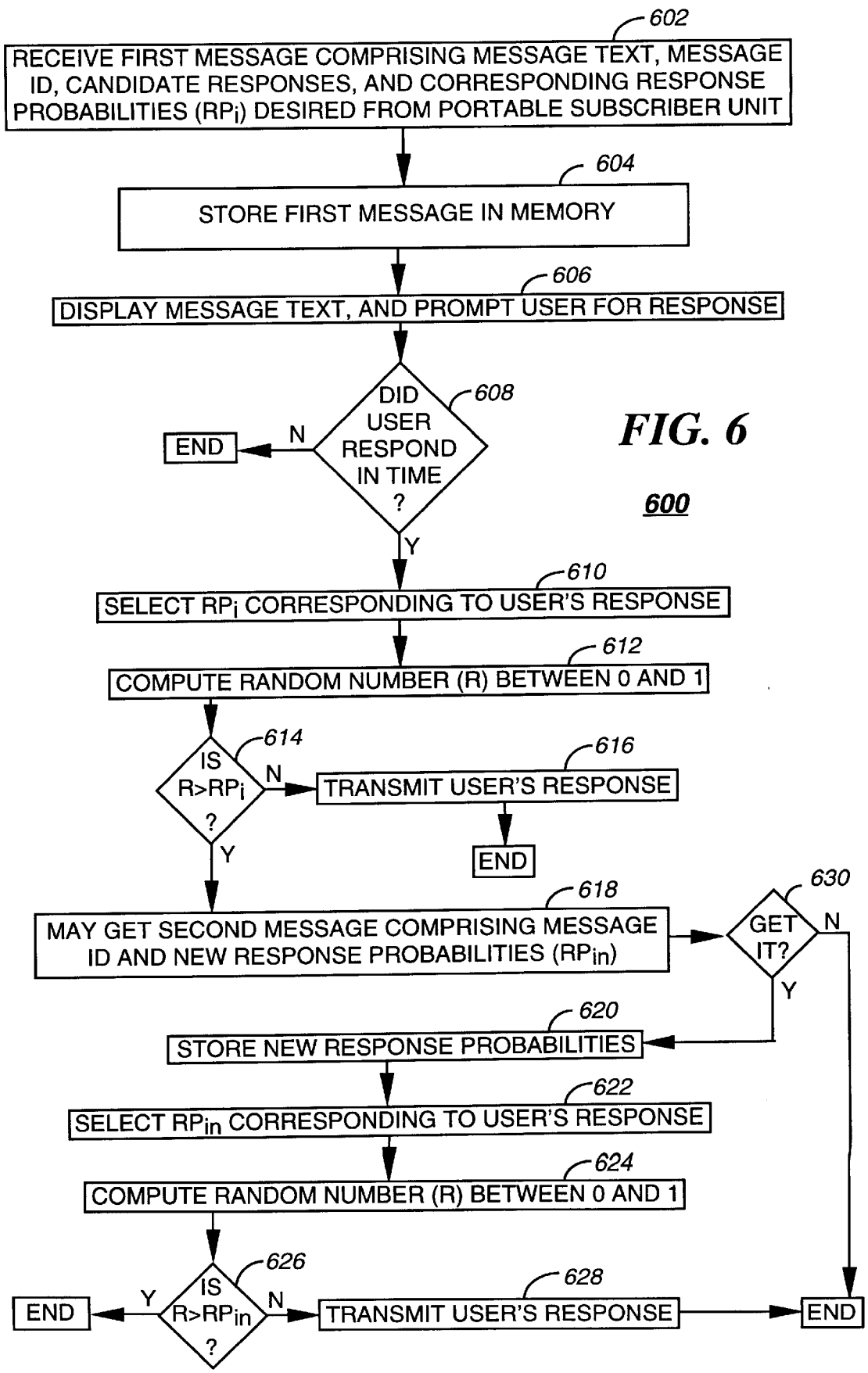
FIG. 6 is a flow diagram depicting operation of the portable subscriber unit in response to a statistical response polling message in accordance with the present invention.

FIG. 6 is a flow diagram 600 depicting operation of the portable subscriber unit 122 in response to a statistical response polling message in accordance with the present invention. For completeness, it is assumed that the first statistical response message 400 comprises the message text 402, the special character 404, the message identifier 406, a plurality of response probabilities 408, and a corresponding plurality of candidate responses 410. The portable subscriber unit 122 receives 602 the first statistical response message 400. The portable subscriber unit 122 then stores 604 the first message 400 in appropriate locations of the memory 212. The portable subscriber unit 122 then displays 606 the message text 402, and prompts the user for a response. In step 608 the portable subscriber unit 122 checks whether the user has responded before a predetermined response time-out. If not, the process ends. If so, the portable subscriber unit 122 selects 610 the one of the plurality of response probabilities 408 corresponding to the candidate response selected by the user. The portable subscriber unit 122 then computes 612 a random number between 0 and 1. The portable subscriber unit 122 then checks 614 whether the random number is greater than the one of the plurality of response probabilities 408. If not, the portable subscriber unit 122 transmits 616 the user's response, and then the process ends. It will be appreciated that, depending upon the address to which the statistical response message 400 is sent, and further depending upon design choice, the portable subscriber unit 122 can respond using the same or a different address compared to that used for sending the statistical response message 400.

If, on the other hand, in step 614 the random number is greater than the one of the plurality of response probabilities 408, then the portable subscriber unit 122 may receive 618 a second statistical response message 400 comprising the same message identifier 406 and new response probabilities. In step 630 the portable subscriber unit 122 determines whether the second statistical response message 400 was received within a predetermined time limit. If not, the process ends. If so, the portable subscriber unit 122 stores 620 the new response probabilities. The portable subscriber unit 122 then selects 622 the new response probability corresponding to the user's earlier response. The portable subscriber unit 122 then preferably computes 624 a random number between 0 and 1. It will be appreciated that, alternatively, the portable subscriber unit 122 may simply use the same random number computed in step 612. In either case, the portable subscriber unit 122 then checks 626 whether the random number is greater than the new response probability corresponding to the user's earlier response. If so, the process ends. If not, the portable subscriber unit 122 transmits 628 the user's response, and then the process ends. This process advantageously allows polling of a large population of portable subscriber units 122 without incurring an overly large number of inbound responses, which could otherwise overload the inbound channel.

Figure 7:
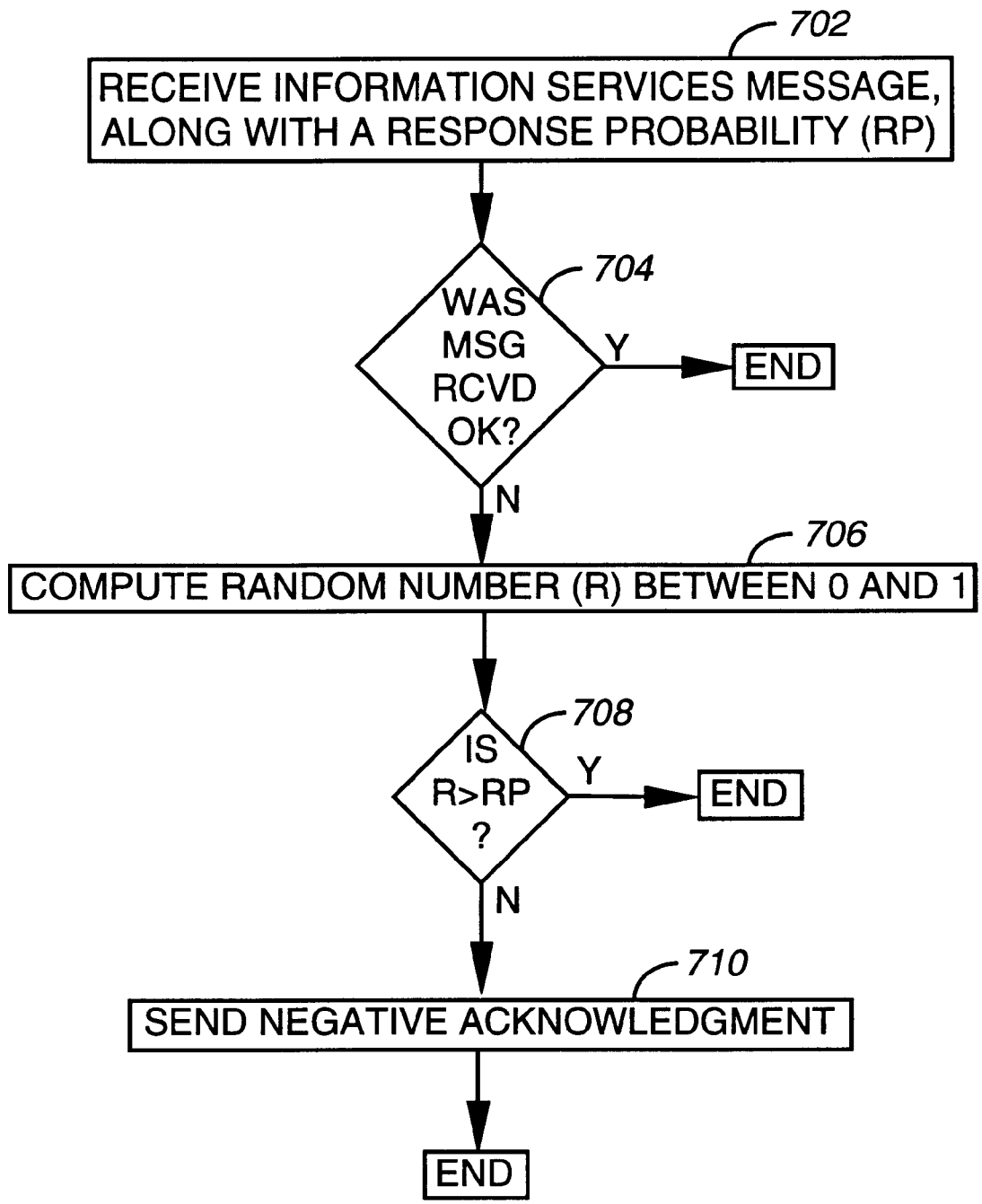
FIG. 7 is a flow diagram depicting operation of the portable subscriber unit in response to a statistical response information services message in accordance with the present invention.

FIG. 7 is a flow diagram 700 depicting operation of the portable subscriber unit 122 in response to a statistical response IS message in accordance with the present invention. The process begins with the portable subscriber unit 122 receiving 702 the statistical response IS message comprising message text 402 addressed to an IS address of the portable subscriber unit 122, along with a response probability 408. The portable subscriber unit 122 then checks 704, using well-known techniques, whether the message 400 was received correctly. If so, the process ends. If not, the portable subscriber unit 122 preferably computes 706 a random number between 0 and 1. The portable subscriber unit 122 then checks 708 whether the random number is greater than the response probability 408. If so, the process ends. If not, the portable subscriber unit 122 transmits 710 a negative acknowledgment, and then the process ends. This process advantageously allows a determination of the reliability of reception of IS messages to be made without creating a flood of negative acknowledgments, which could overload the inbound channel and disrupt other traffic. It will be appreciated that, depending upon the address to which the statistical response message 400 is sent, and further depending upon design choice, the portable subscriber unit 122 can respond using the same or a different address compared to that used for sending the statistical response message 400.

Thus, it should be clear from the preceding disclosure that the present invention provides a method and apparatus for reducing inbound transmissions in a two-way messaging system, particularly in response to messages sent to a group address. The method and apparatus advantageously allows polling exercises to occur with substantially less impact to inbound traffic, and further allows service providers to assess the reliability of IS message transmissions without inbound traffic overload.

Many modifications and variations of the present invention are possible in light of the above teachings. For example, many other techniques can be utilized for controlling the portable subscriber unit to select between responding and not responding to a message, in a manner that satisfies a response probability specified in the message. Thus, it is to be understood that, within the scope of the appended claims, the invention can be practiced other than as described herein above.

What is claimed is:

1. A method of reducing inbound transmissions in a two-way messaging system, the method comprising, in a fixed portion of the two-way messaging system, the step of
   transmitting a first message comprising a value indicative of a response probability desired from a portable subscriber unit; and
   in the portable subscriber unit, the steps of:
      receiving the first message; and
      selecting between responding and not responding to the first message, in a manner that satisfies said response probability.

2. The method of claim 1, wherein the transmitting step comprises the step of transmitting the first message to an address to which a plurality of portable subscriber units are potentially responsive.

3. The method of claim 1, further comprising in the fixed portion of the two-way messaging system the steps of:
   receiving fewer than a predetermined number of responses to the first message; and
   in response, sending a second message comprising a different value indicative of the response probability.

4. The method of claim 1, further comprising in the portable subscriber unit the steps of:
   receiving a second message comprising a different value indicative of the response probability; and
   re-performing the selecting step utilizing the different value only when no response to the first message was generated.

5. The method of claim 1,
   wherein the first message is of a predetermined type in which a positive acknowledgment is assumed by the fixed portion, unless a negative acknowledgment is received thereby, and
   wherein the selecting step is performed only when a response to the first message, if generated, will be a negative acknowledgment, and
   wherein no response is generated otherwise.

6. The method of claim 1, further comprising in the fixed portion of the two-way messaging system the steps of:
   receiving from a plurality of portable subscriber units a plurality of responses to the first message; and
   forming from the plurality of responses a plurality of tallies, a tally corresponding to a possible response choice.

7. The method of claim 1,
   wherein the transmitting step comprises the step of sending in the first message a plurality of candidate responses, and
   wherein the method further comprises in the portable subscriber unit the step of accepting a selection of one of the plurality of candidate responses from a user of the portable subscriber unit.

8. The method of claim 7,
   wherein the transmitting step further comprises the step of sending in the first message a plurality of values indicative of the response probability corresponding to the plurality of candidate responses, and wherein the selecting step comprises the step of selecting between responding and not responding to the first message, such that the response probability corresponding to the one of the plurality of candidate responses selected by the user is satisfied.

9. The method of claim 8, further comprising in the fixed portion of the two-way messaging system the steps of:

receiving from a plurality of portable subscriber units a plurality of responses to the first message;

forming from the plurality of responses a plurality of tallies corresponding to the plurality of candidate responses; and adjusting the plurality of tallies in accordance with the corresponding response probability.

10. A controller for reducing inbound transmissions in a two-way messaging system, the controller comprising:

a network interface for receiving messages from message originators;

a processing system coupled to the network interface for processing the messages and for directing operation of the controller; and a base station interface coupled to the processing system for communicating with a base station to send and receive outbound and inbound messages, wherein the processing system is programmed to:
transmit a first message comprising a value indicative of a response probability desired from a portable subscriber unit;
receive from a plurality of portable subscriber units a plurality of responses to the first message; and
form from the plurality of responses a plurality of tallies, a tally corresponding to a possible response choice.

11. The controller of claim 10, wherein the processing system is further programmed to send a second message comprising a different value indicative of the response probability, in response to receiving fewer than a predetermined number of responses to the first message.

12. The controller of claim 10, wherein the processing system is further programmed to send in the first message a plurality of candidate responses.

13. The controller of claim 12, wherein the processing system is further programmed to send in the first message a plurality of values indicative of the response probability corresponding to the plurality of candidate responses.

14. The controller of claim 13, wherein the processing system is further programmed to:

receive from a plurality of portable subscriber units a plurality of responses to the first message;

form from the plurality of responses a plurality of tallies corresponding to the plurality of candidate responses; and adjust the plurality of tallies in accordance with the corresponding response probability.

15. A portable subscriber unit for reducing inbound transmissions in a two-way messaging system, the portable subscriber unit comprising:

a receiver for receiving a first message comprising a value indicative of a response probability desired from the portable subscriber unit;

a processing system for processing the first message and for controlling the portable subscriber unit;

a transmitter coupled to the processing system for transmitting a response to the first message; and a user interface for interfacing with a user, wherein the processing system is programmed to select between responding and not responding to the first message, in a manner that satisfies said response probability.

16. The portable subscriber unit of claim 15, wherein the processing system is further programmed such that in response to receiving a second message comprising a different value indicative of the response probability, the processing system again selects between responding and not responding to the first message, in a manner that satisfies said response probability utilizing the different value, but only when no response to the first message was generated.

17. The portable subscriber unit of claim 15, wherein the first message is of a predetermined type in which a positive acknowledgment is assumed by a fixed portion of the two-way messaging system, unless a negative acknowledgment is received thereby, and wherein the processing system is further programmed to select between responding and not responding to the first message, in a manner that satisfies said response probability, only when a response to the first message, if generated, will be a negative acknowledgment; and to generate no response otherwise.

18. The portable subscriber unit of claim 15, wherein the processing system is further programmed to accept a selection of one of a plurality of candidate responses from the user of the portable subscriber unit.

19. The portable subscriber unit of claim 18, wherein the processing system is further programmed to select between responding and not responding to the first message, in a manner that satisfies the response probability corresponding to the one of the plurality of candidate responses selected by the user.

* * * * *